E. ALBERTI.
CORK CUTTING MACHINE.
APPLICATION FILED FEB. 20, 1917.

1,261,672.

Patented Apr. 2, 1918.
5 SHEETS—SHEET 2.

INVENTOR.
E. Alberti
BY
ATTORNEY

E. ALBERTI.
CORK CUTTING MACHINE.
APPLICATION FILED FEB. 20, 1917.

1,261,672.

Patented Apr. 2, 1918.
5 SHEETS—SHEET 4.

INVENTOR.
E. Alberti
BY Sigmund Herzog
his ATTORNEY

E. ALBERTI.
CORK CUTTING MACHINE.
APPLICATION FILED FEB. 20, 1917.

1,261,672.

Patented Apr. 2, 1918.
5 SHEETS—SHEET 5.

INVENTOR.
E. Alberti
BY
his ATTORNEY

UNITED STATES PATENT OFFICE.

EMILIO ALBERTI, OF NEW YORK, N. Y., ASSIGNOR TO INTERNATIONAL CORK COMPANY, OF BROOKLYN, NEW YORK, A CORPORATION OF NEW YORK.

CORK-CUTTING MACHINE.

1,261,672. Specification of Letters Patent. Patented Apr. 2, 1918.

Application filed February 20, 1917. Serial No. 149,798.

*To all whom it may concern:*

Be it known that I, EMILIO ALBERTI, a citizen of the United States, and a resident of the city of New York, in the county of Kings and State of New York, have invented certain new and useful Improvements in Cork-Cutting Machines, of which the following is a specification.

The present invention relates to an improved cork cutting apparatus, and more particularly to a machine for producing disks from cork strips, which are to be employed in the manufacture of the well-known Crown corks, or generally in the production of closures of the cap variety.

The main object of the invention is to provide an automatic machine for cutting cork disks, which machine feeds the strips to the cutter and holds them in proper position for cutting, and which is rapid and efficient in operation, and from which a comparatively large amount of product may be obtained with a relatively small amount of waste.

A further object of the invention is to provide a novel cutting mechanism, which makes the use of special stripping or ejecting devices unnecessary in that the disks being cut act as ejecting means for those cut by previous cutting operations.

A still further object of the invention is to produce a cutter, through which the disks are adapted to pass without interfering with the cutting operation thereof.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
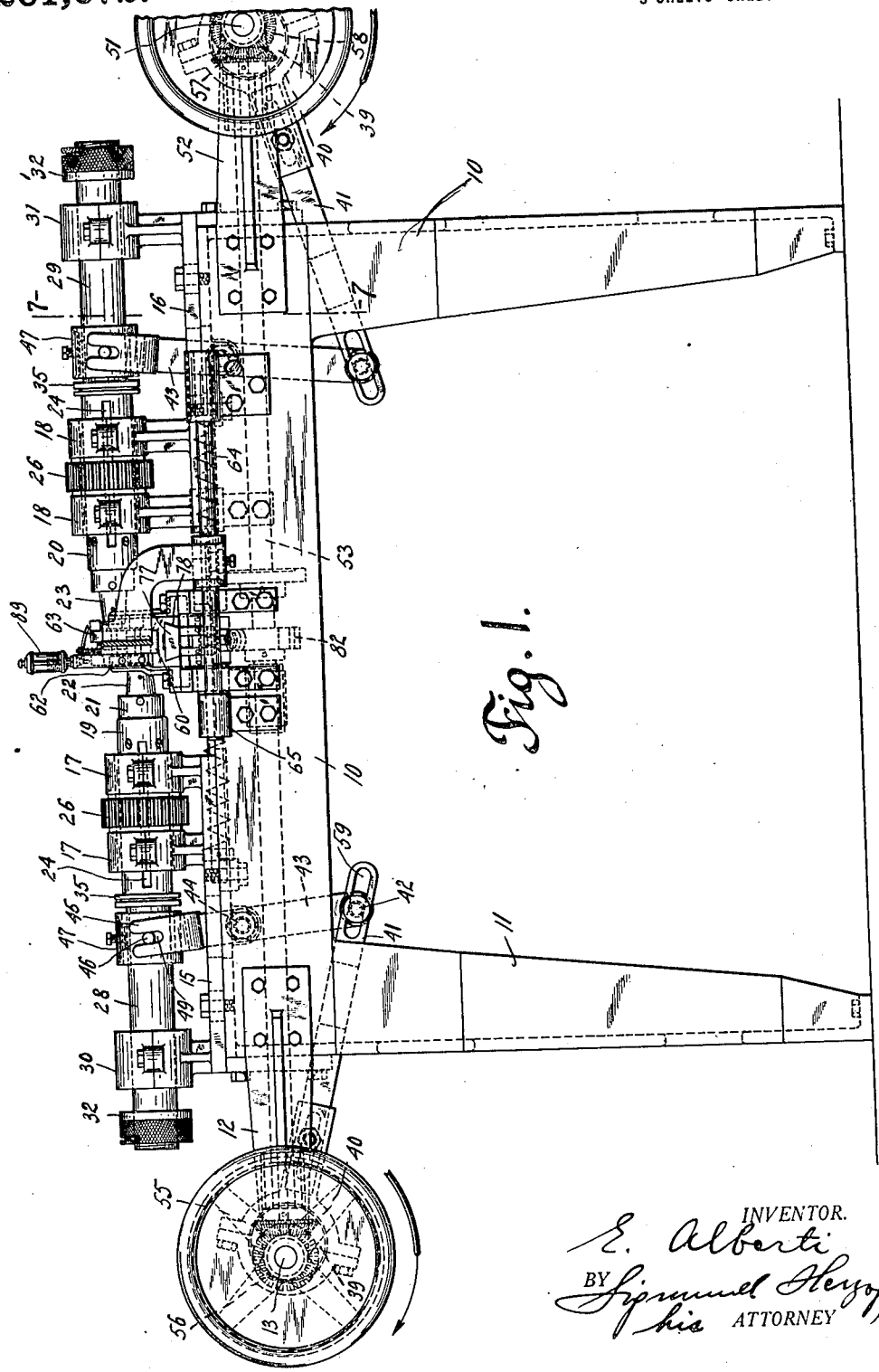
Figure 2:
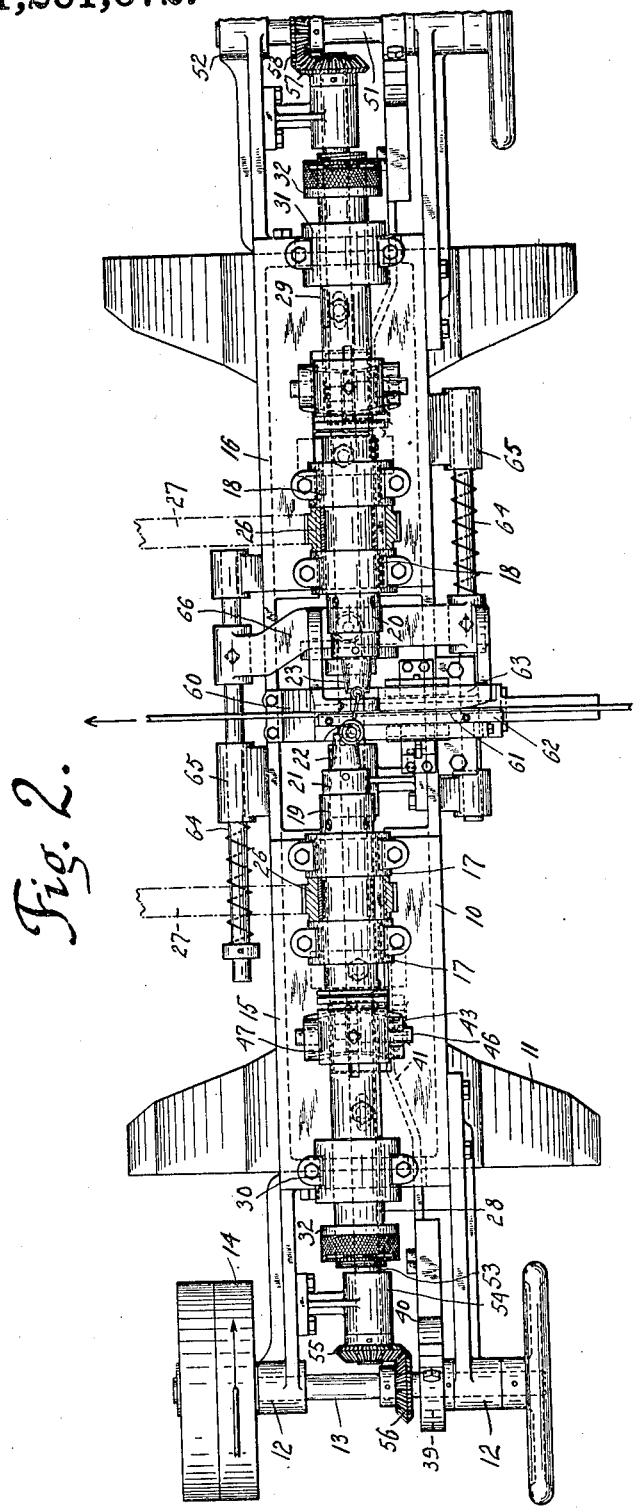
Figure 3:
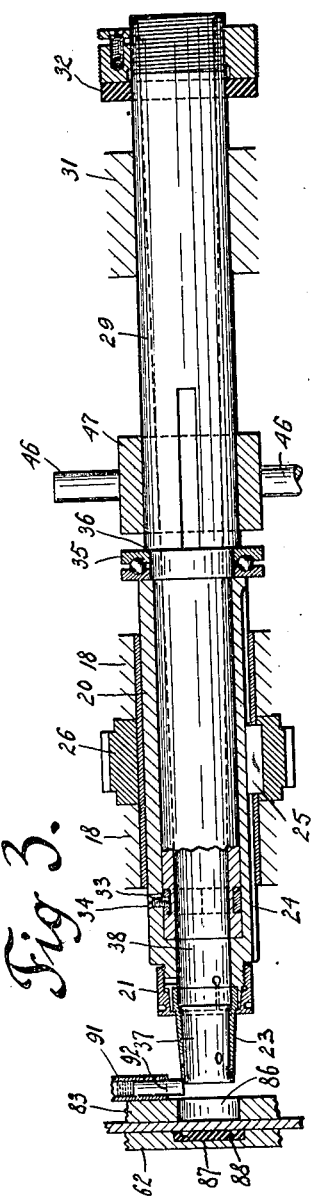
Figure 4:
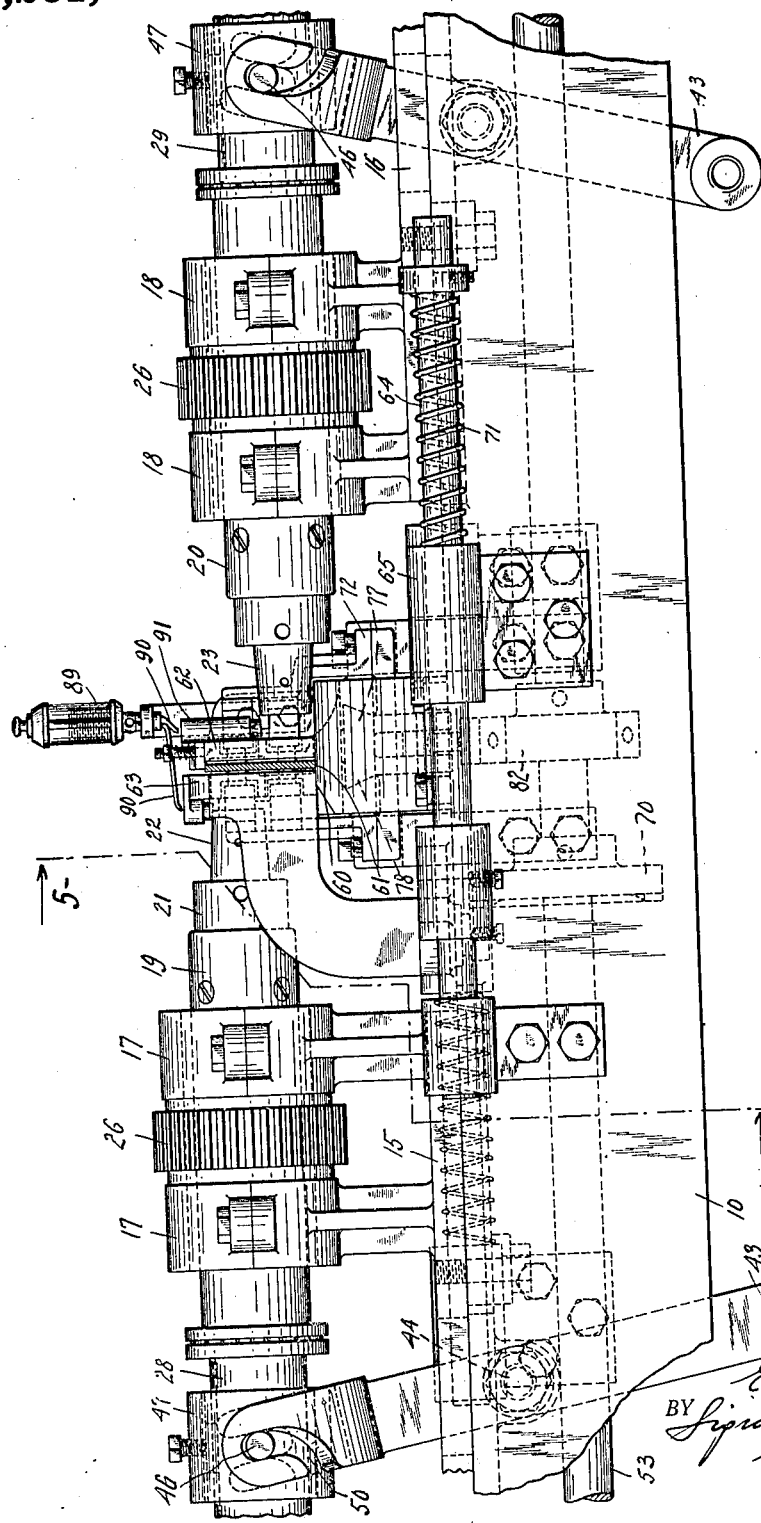
Figure 5:
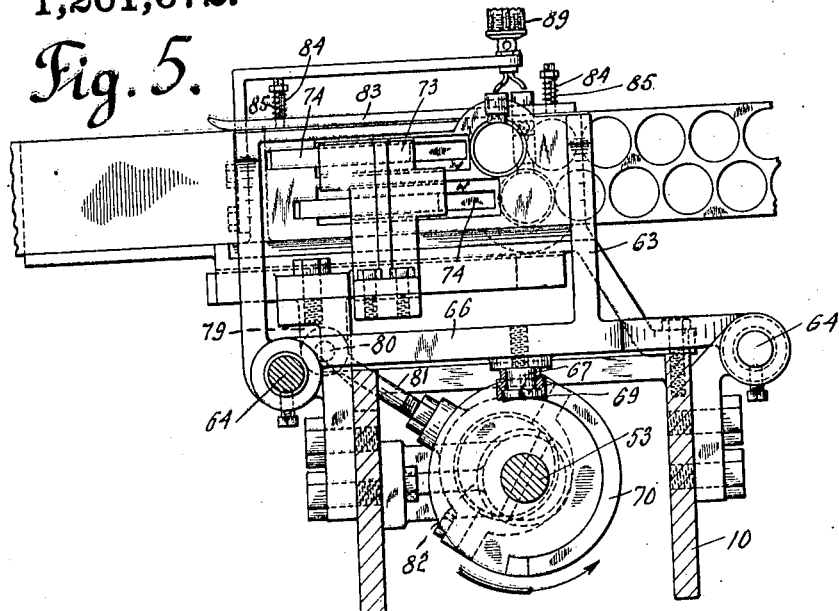
Figure 6:
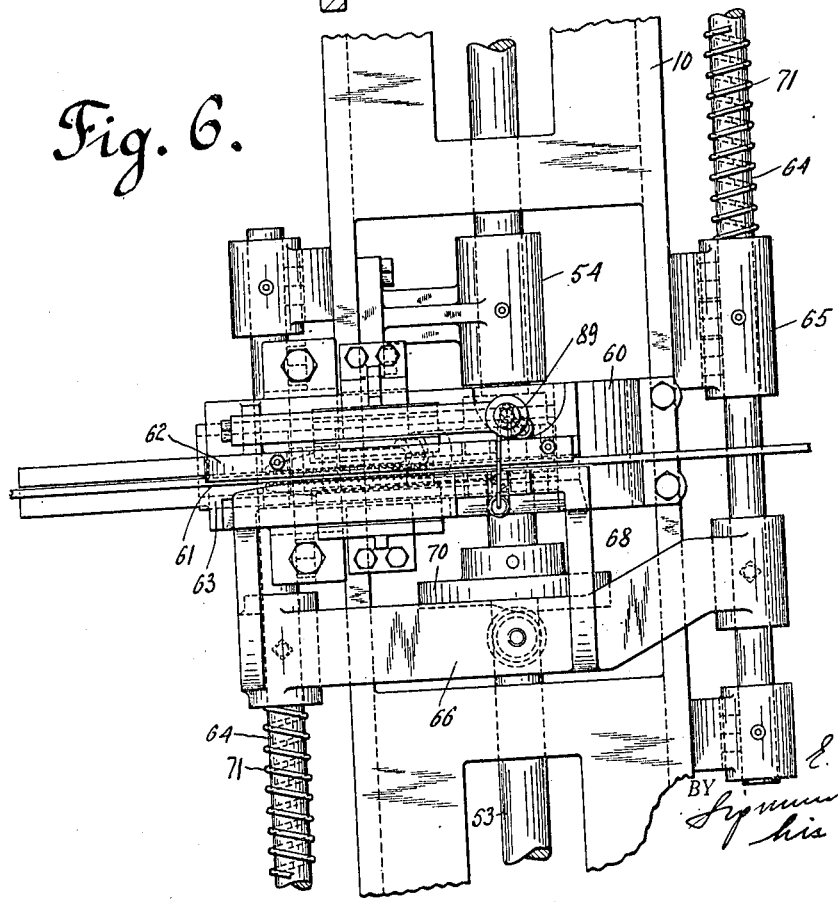
Figure 7:
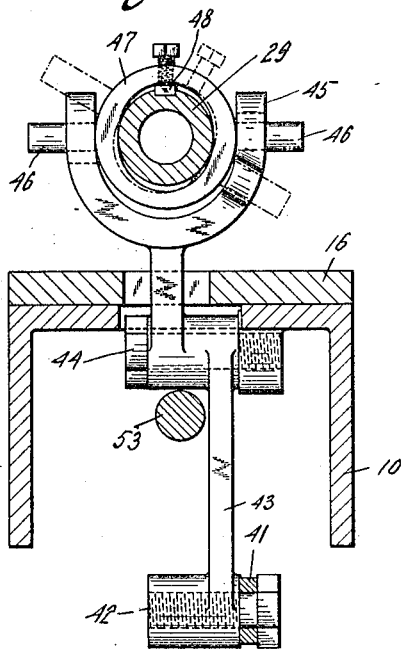
Figure 8:
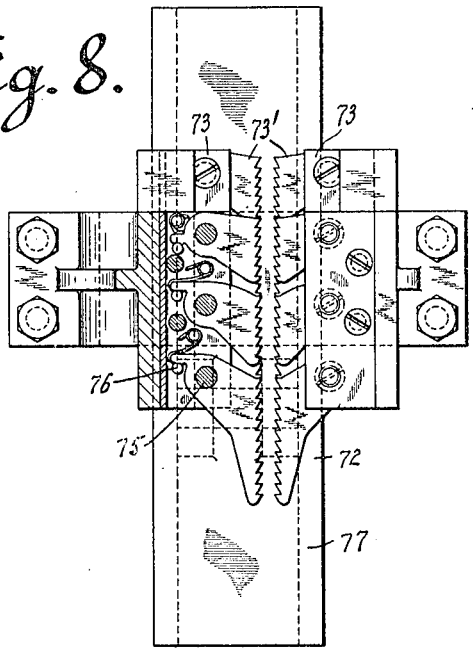
Figure 10:
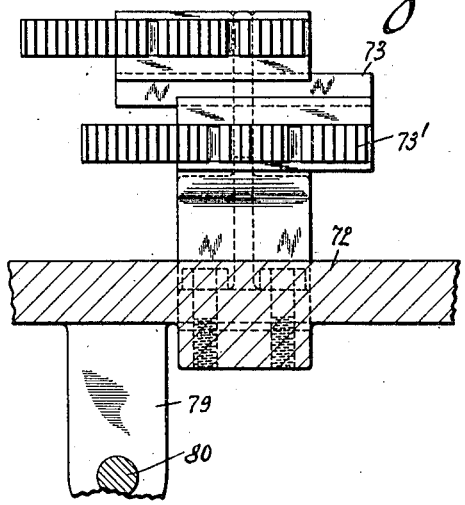
Figure 9:
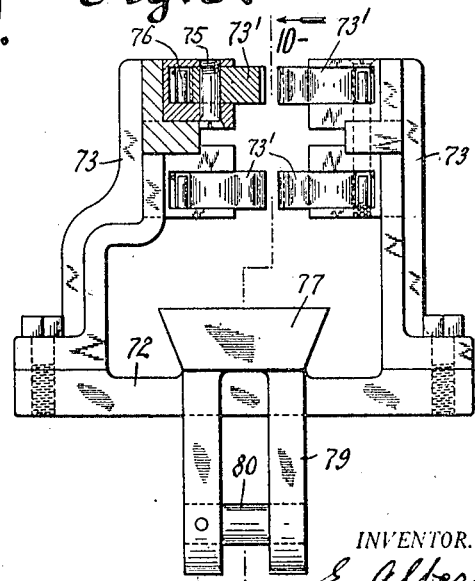

Figure 1 is a front elevation of a cork cutting machine constructed in accordance with the present invention; Fig. 2 is a top plan view thereof, certain parts being shown in section; Fig. 3 is a horizontal longitudinal section taken through the cutting mechanism; Fig. 4 is a rear elevation, on a larger scale, of the central portion of the machine; Fig. 5 is a section taken on line 5—5 of Fig. 4; Fig. 6 is a top plan view of the detail shown in Fig. 5; Fig. 7 is a section taken on line 7—7 of Fig. 1, on a larger scale; Fig. 8 is a horizontal longitudinal section taken through the cork strip feeding mechanism; Fig. 9 is a front elevation of the device shown in Fig. 8, partly in section; and Fig. 10 is a section taken on line 10—10 of Fig. 9.

In the drawings, the numeral 10 designates the main or supporting frame of the machine, resting on legs 11. The frame carries bearings 12, in which is journaled the driving shaft 13 of the machine. To this shaft rotation may be imparted in any suitable manner, for instance, by keying to the same a pulley 14, which is driven by means of a belt (not shown).

Upon the table portion of the frame rest two bases 15 and 16, from each of which rises a set of bearings, those upon the base 15 being denoted by the numeral 17, and those upon the base 16 by the numeral 18. In the bearings 17 is rotatably and reciprocably mounted a tubular arbor 19, and in the bearings 18 is mounted in a similar manner a tubular arbor 20. To the arbor 19 is secured, for instance, by a clamping nut 21 a tubular cutter 22, and to the arbor 20 in a similar manner a tubular cutter 23. The two arbors and cutters are staggered in relation to each other, the distance between their longitudinal axes being, in a plane disposed at 60° to a horizontal plane, greater than the diameter of a cork disk to be cut. Each of the arbors is provided with a longitudinal groove 24 in its outer face, into which groove fits a feather key 25, that attaches to the arbor a pinion 26. The pinion of the arbor 19 is held against longitudinal movement between the bearings 17, and the pinion of the arbor 20 between the bearings 18. The groove and key arrangement permit lengthwise or reciprocating movement of the arbors, and also of rotary motion thereof. The pinions 26 are driven from any suitable source of power (not shown) by the intermediary of driving chains 27. It is obvious that, instead of the pinions, pulleys may be employed. Into the arbors 19 and 20 reach tubular discharge chutes, the chute associated with the arbor 19 being denoted by the numeral 28 and that coöperating with the arbor 20 by the numeral 29. These chutes are straight, as clearly appears from the several figures of the drawings. Each of these chutes is disposed in alinement with its corresponding arbor, the chute 28 being journaled in a bearing 30, that is in registering position with the bearing set 17, and the chute 29 in a bearing 31, that registers with the bearing set 18. Upon the outer end of each chute is mounted a resilient stop ring 32, that is adapted to abut against the bearing adjacent the same. Each chute is connected with its arbor by a ring 33 and a screw 34, the connection being such that the chute reciprocates with its arbor, but does not rotate therewith. A ball bearing 35 is mounted upon each chute and abuts against the outer end of the arbor and a shoulder 36 upon the chute. These ball bearings take up the lengthwise thrust of the arbors. The bore 37 in each of the cutters is conical, the diameter of the bore at its cutting edge corresponding to the diameter of the disk to be cut, and the diameter of its inner end being somewhat larger, for a purpose hereinafter to be described. In a similar manner is the bore 38 of each chute tapered, it being smaller at its end, that is adjacent the cutter, than at its outer end, at which the stop ring 32 is mounted.

The arbors and chutes are reciprocated, that is to say they are advanced into and retracted from the work.

For this purpose there is keyed to the driving shaft 13 an eccentric 39, to the strap 40 of which is attached in any suitable manner an eccentric rod 41, to which is pivoted at 42 a lever 43, the latter being fulcrumed at 44 to the frame 10. The upper end of the lever is fork-shaped, as shown at 45, and in engagement with pins 46 that are carried by a sleeve 47, the latter being connected with the chute 28 by a key 48 (Fig. 7). In order to permit the arbor 28 to be disengaged from the lever 43, one of the pins 46 is seated in a longitudinal slot 49 in one of the prongs of the fork-shaped end of the lever (Fig. 1), while its other pin is seated in an inclined slot 50 in the other prong of the lever (Fig. 4). In this manner the chute can be given a partial turn to be brought into the position shown in dotted lines in Fig. 7 of the drawings, after which the said chute and the arbor connected therewith can be shifted longitudinally toward the driving shaft 13, in order to permit the cutter 22 to be sharpened or ground without removing it from the machine. The arbor 20 and chute 29 are reciprocated by a mechanism similar in all respects to that described in connection with the arbor 19. The eccentric actuating the same, however, is mounted on a counter-shaft 51, journaled in bearings 52 on the frame 10. This counter shaft is driven from the driving shaft 13 by the intermediary of a longitudinally disposed shaft 53, journaled in bearings 54. The shaft 53 carries upon one of its ends a bevel gear 55 in mesh with a bevel gear 56, the latter being fixed to the driving shaft 13. Upon its other end there is mounted upon the shaft 53 a bevel gear 57 in mesh with a similar gear 58 upon the counter-shaft 51. The two eccentrics are timed in such a manner that both cutting mechanisms advance simultaneously toward the work, and also recede therefrom simultaneously.

In order to adjust the strokes of the cutting mechanisms, there are provided in the eccentric rods 41 longitudinal slots 59, in which are seated the pivot bolts 42. By changing the positions of these pivot bolts in the slots 59, the strokes of the levers 43 may be changed according to the requirements.

The work holder of the machine is mounted upon a base plate 60, that is disposed above the table portion of the main frame, to which it is attached by screws or otherwise. On the work holder is formed a feedway 61, for the strips of cork, and on one side of this feedway rises from the work holder a stationary gripping jaw 62, with which coöperates a movable gripping jaw 63, that is disposed upon the other side of the feedway and is adapted to move toward and away from said stationary jaw. The movable jaw is attached to two bars 64, which are slidably mounted in bearings 65 on the two sides of the frame 10. The two bars are connected by a bridge 66. To the underface of this bridge is attached a downwardly projecting pin 67, that extends through an opening 68 in the table portion of the frame and carries an anti-friction roller 69, bearing against a cam disk 70. This cam disk is attached to the shaft 53. Springs 71, coiled upon the bars 64, have a tendency to keep the anti-friction roller and cam disk in contact. In this manner the movable jaw is caused to move toward and away from the fixed or stationary jaw.

The cork strip feeding means comprises a carriage 72, upon which are mounted feeding clamps 73. Each of the clamps is provided with a plurality of spring-pressed toothed pawls 73′, which project through slots 74 in the jaws, and are adapted to engage the sides of the cork strips. These pawls are pivoted at 75 to the feeding clamps, their movement around the said pivots being limited by stop pins 76. The carriage is provided with a dove-tailed guide 77, which is seated in a similarly shaped groove 78, the latter being formed in the underface of the base plate 60 and extends transversely of the main frame 10. The feeding clamps are actuated in the following manner: The carriage 72 is provided with downwardly projecting extensions 79, carrying a pivot pin 80, that is engaged by the rod 81 of an eccentric 82, the latter being mounted upon the shaft 53.

With the feeding mechanism of the machine is associated a presser-foot 83, in the form of a narrow strip, that is slidably mounted upon spindles 84, upon the latter being coiled springs 85, which have a tendency to force the said presser-foot downward. The spindles are carried by the stationary jaw 62, and part of the presser-foot projects above the feedway, thereby engaging the cork strips and forcing them down onto the work support.

The manner in which the eccentrics 39, the cam disk 70, and the eccentric 82 are timed will appear from the description of the operation of the device hereinafter given.

In alinement with each cutter there is formed in the jaw adjacent it a circular opening 86, that is substantially larger in diameter than the disks to be cut, and in registering position with this opening is formed in the other jaw a recess 87, in which is disposed a resilient disk 88, to prevent the cutting edge of the tubular cutter from being injured.

For the purpose of lubricating the cutters, there is mounted upon the stationary jaw an oil cup 89, from which lead tubes 90 to magazines 91, which are supported by the stationary jaw and contain each absorbent material 92, that is in contact with the cutters.

The operation of this device is as follows: The machine is constructed to cut disks from cork strips. The cork strips are, one after the other, placed upon the work support between the stationary and movable jaws and advanced manually until they are within the reach of the feeding clamps. Before the rotary cutters, on their forward stroke, reach the jaws, the movable jaw presses the cork strip firmly against the stationary jaw, the presser-foot working against the upper face of the strip, thereby holding the same down on the feedway. The cutters, in completing their forward strokes, cut simultaneously two disks from the strip, the said disks remaining within the cutters, to be removed therefrom by those subsequently being cut. The finished product moves through the discharge chutes and falls into inclined chutes (not shown), in which it slides down into a receptacle below the same, (this receptacle is neither shown). It is to be observed that both the cutters and the chutes are tapered toward their outer ends. The purpose of this is to prevent clogging of the same. The tubular chutes reciprocate, but do not rotate with the cutters, as otherwise a proper discharge of the finished product could not take place.

The eccentrics 39, the cam disk 70, and the eccentric 82 are timed in such a manner that, during the cutting operation, the gripping jaws hold the cork strip against motion. While the cutting operation takes place, that is to say during the time the gripping jaws hold the cork strip against movement, the feeding clamps are moved by the eccentric 82 on their idle stroke. After the cutting operation has been performed, the movable gripping jaw recedes from the stationary one. The eccentric 82 causes then the feeding clamps to move the cork strip a predetermined distance toward the cutters. The gripping jaws engage then again the work. The cycle of operation now described is then repeated.

From the foregoing it appears that each of the cutting mechanisms includes an arbor, that is made of two sections, one of which is rotated and reciprocated, while the other one, hereinbefore termed "chute," has a reciprocating motion only.

It is obvious that, while herein the machine has been described as a device for cutting disks from cork strips, it might just as well be used for blocking corks from cork strips, in which case, obviously, the feedway must be wider to accommodate thicker strips.

What I claim is:

1. In a cork cutting machine, the combination with a work support, of two cutting mechanisms associated therewith, said cutting mechanisms including tubular cutters that are staggered in relation to each other to perform two cutting operations simultaneously, said cutters being disposed on opposite sides of said work support.

2. In a cork cutting machine, the combination with a work support, of two cutting mechanisms associated therewith, said cutting mechanisms including tubular cutters that are staggered in relation to each other, said cutters being disposed on opposite sides of said work support, and means for simultaneously advancing said cutters into the work and also simultaneously retracting them from the work.

3. In a cork cutting machine, the combination with a frame, of a plurality of bearings thereon, a tubular arbor mounted in said bearings, said arbor being made of two sections, means for rotating one of said sections, means for reciprocating both sections, and a tubular cutter attached to said rotating section.

Signed at New York, in the county of Kings and State of New York, this 10th day of February, A. D. 1917.

EMILIO ALBERTI.

Copies of this patent may be obtained for five cents each, by addressing the "Commissioner of Patents, Washington, D. C."